United States Patent
Stallings et al.

(10) Patent No.: US 9,189,130 B2
(45) Date of Patent: Nov. 17, 2015

(54) APPLICATION SHORTCUT USER INTERFACE SYSTEMS AND METHODS

(75) Inventors: Heath Stallings, Colleyville, TX (US); Omar Abou-Khamis, Irving, TX (US); Nathan J. Maxfield, Wakefield, MA (US); Ashok Kumar, Westley Chapel, FL (US); Andrien J. Wang, Keller, TX (US); Don G. Archer, Euless, TX (US); Aravind Perumandla, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 104 days.

(21) Appl. No.: 13/343,909

(22) Filed: Jan. 5, 2012

(65) Prior Publication Data
US 2013/0179833 A1    Jul. 11, 2013

(51) Int. Cl.
*G06F 3/048* (2013.01)
*G06F 9/44* (2006.01)
*G06F 3/0482* (2013.01)

(52) U.S. Cl.
CPC .................................. *G06F 3/0482* (2013.01)

(58) Field of Classification Search
CPC .. G06F 3/0481; G06F 3/04817; G06F 9/4443
USPC .......................................................... 715/810
See application file for complete search history.

(56) References Cited

U.S. PATENT DOCUMENTS

| 6,424,360 | B1 * | 7/2002 | Torres ........................... 715/810 |
| 7,398,480 | B2 * | 7/2008 | Zimniewicz et al. ......... 715/841 |
| 2008/0184340 | A1 * | 7/2008 | Nakamura et al. ................ 726/3 |
| 2009/0013317 | A1 * | 1/2009 | Abfalter et al. ............... 717/170 |
| 2009/0049384 | A1 * | 2/2009 | Yau ................... 715/716 |
| 2010/0077347 | A1 * | 3/2010 | Kirtane et al. ................ 715/803 |
| 2010/0107150 | A1 * | 4/2010 | Kamada et al. ............... 717/170 |
| 2010/0145861 | A1 * | 6/2010 | Law et al. ........................ 705/76 |
| 2011/0289499 | A1 * | 11/2011 | Haubold et al. .............. 717/173 |
| 2011/0302571 | A1 * | 12/2011 | O'Farrell et al. ............. 717/170 |
| 2012/0023194 | A1 * | 1/2012 | Ruiz-Velasco et al. ........ 709/217 |

OTHER PUBLICATIONS

"How to add and remove applications using BlackBerry Desktop Software for PC", Feb. 18, 2011 electronic publication date, retrieved from the Internet on Jul. 11, 2014 at http://helpblog.blackberry.com/2011/02/add-and-remove-blackberry-apps/.*

* cited by examiner

*Primary Examiner* — Doon Chow
*Assistant Examiner* — Shourjo Dasgupta

(57) ABSTRACT

An exemplary method includes a user computing device 1) determining current states, such as current integration states and/or current operational states, of software applications included in a suite of software applications relative to the user computing device, 2) identifying, based on the current states, access options for the software applications included in the suite of software applications, and 3) providing, by the user computing device for display, a graphical user interface that includes the access options configured to be selected by a user of the user computing device to access the software applications included in the suite of software applications. Corresponding methods and systems are also disclosed.

24 Claims, 14 Drawing Sheets

APPLICATION SHORTCUT USER INTERFACE SYSTEMS AND METHODS

BACKGROUND INFORMATION

Advances in computing technologies have provided users of computing devices with access to a variety of computing tools. To illustrate, increased capabilities of computing devices such as mobile smart phones and tablet computers have allowed users of the devices to access and use a variety of software applications that have been developed for the computing devices. As such devices have become popular, an increased number of software applications have been developed and made available to users of the devices.

Such advances in computing technologies have challenged designers of user interfaces for computing devices, especially mobile computing devices such as mobile smart phones and tablet computers. For example, a common challenge has been to design and implement user interfaces that provide an appropriate balance of information, usability, intuitiveness, control, and functionality that promotes a quality user experience. While user interface technologies have made significant advances in this regard, there remains room for improvement. For instance, there remains room to improve the intuitiveness, convenience, and/or usability of user interfaces that are designed to be used by a user of a computing device to control, access, or otherwise manage software applications running and/or capable of running on the computing device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
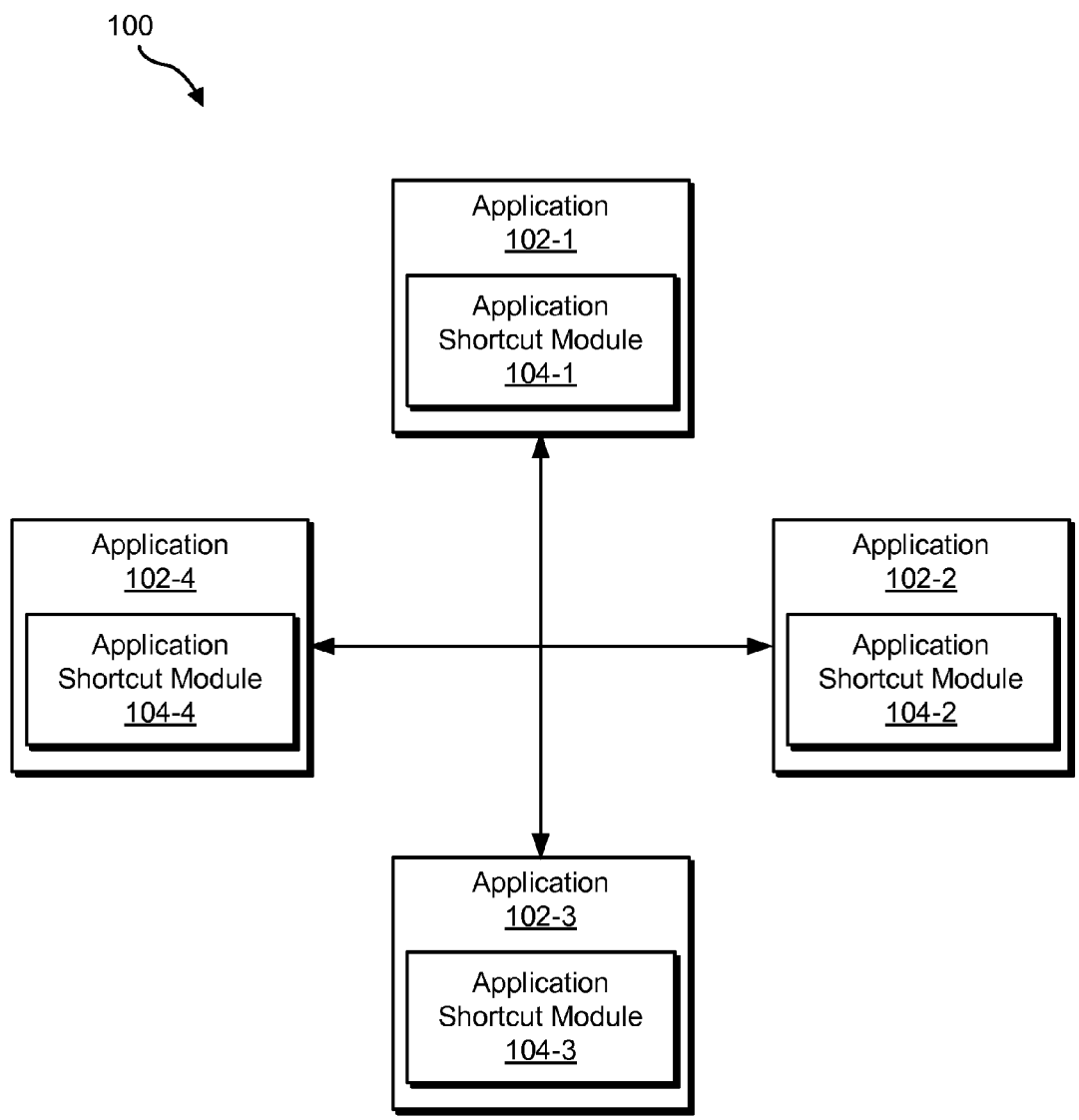
FIG. 1 illustrates an exemplary suite of discrete software applications according to principles described herein.

Exemplary application shortcut user interface systems and methods are disclosed herein. The exemplary systems and methods described herein may provide a user interface configured to facilitate shortcut access, by a user, to software applications included in a suite of software applications. In certain embodiments, the user interface may be provided by a software application included in the suite of software applications such that a user of a user computing device executing the software application may be provided with shortcut access, from the user interface and/or the software application, to one or more other software applications included in the suite of software applications. In certain alternative embodiments, the user interface may be provided by an independent software application not included in the suite of software applications such that a user of a user computing device executing the independent software application may be provided with shortcut access, from the user interface and/or the independent software application, to one or more of the software applications included in the suite of software applications.

An application shortcut user interface provided by the systems and methods described herein may include access options configured to be selected by a user to access, from the user interface, software applications included in a suite of software applications. In certain embodiments, the system and methods described herein may be configured to select specific access options for inclusion in the user interface based on determined current states of the software applications included in the suite of software applications. The current states of the software applications may include current integration states (e.g., levels of integration) and/or current operational states of the software applications relative to a user computing device. Examples of such current states of software applications included in a suite of software applications are described herein.

By providing an application shortcut user interface, such as described herein, the exemplary systems and methods described herein may provide a user of a user computing device with information about the current states of software applications included in a suite of software application relative to the user computing device, and with an intuitive, convenient, and/or usable set of user interface tools for shortcut access to software applications included in the suite of software applications. The set of tools may facilitate user access to software applications included in the suite of software applications, without the user having to navigate to a separate, intermediate user interface application access location such as a separate application launch, update, or download user interface location (e.g., a mobile application online storefront commonly known as an "app store"). The application shortcut user interface may additionally help a provider (e.g., a developer) of the suite of software applications to enhance distribution, updating, and/or use of the software applications included in the suite of software applications.

Examples of application shortcut user interface systems and methods will now be described in reference to the accompanying drawings.

FIG. 1 illustrates an exemplary suite 100 of discrete software applications 102 (e.g., software applications 102-1, 102-2, 102-3, and 102-4) that include application shortcut modules 104 (e.g., application shortcut modules 104-1, 104-2, 104-3, and 104-4, respectively) integrated therein. Software applications 102 may be discrete in that each software application 102 may be independently accessed by a user computing device, which access may include the user computing device downloading, installing, and/or executing the software application 102.

Software applications 102 may be a suite of software applications for one or more reasons. For example, software applications 102 may be a suite in that the software applications 102 are developed by a single developer such as a provider of media content and/or communications services. As another example, software applications 102 may be a suite in that software applications 102 are configured to communicate one with another and/or to seamlessly exchange data one with another. As another example, software applications 102 may be a suite in that each software application 102 implements an application shortcut module 104 configured to perform one or more of the application shortcut operations described herein.

When a software application 102 is executing on a user computing device, the software application 102 may be configured to provide one or more application user interfaces for use by a user of the user computing device to interact with functionality of the software application 102. For example, the application user interfaces provided by the software application 102 may include a home screen graphical user interface ("GUI"), one or more menu screen GUIs, and/or any other application GUIs.

The user interfaces that may be provided by the software application 102 may further include an application shortcut user interface provided by the application shortcut module 104 included in the software application 102. The application shortcut user interface provided by the application shortcut module 104 may include access options configured to be selected by the user of the user computing device to access, from the application shortcut user interface, any of the software applications 102 included in the suite 100 of software applications 102. For example, the application shortcut user interface may include an application shortcut GUI that displays graphical objects representing access options that may be selected by the user to launch, update, download, install, or otherwise access any of the other software applications 102 included in suite 100. To illustrate, when software application 102-1 is executing on a user computing device and application shortcut module 104-1 provides an application shortcut user interface for presentation by the user computing device, a user of the user computing device may select an access option included in the application shortcut user interface to launch, update, or download and install software application 102-2, 102-3, or 102-4 on the user computing device.

As mentioned above, specific access options may be selected for inclusion in an application shortcut user interface based on determined current states of software applications included in a suite of software applications. To this end, application shortcut module 104 executing on a user computing device may be configured to determine the current states of software applications 102 included in suite 100 relative to the user computing device. Examples of current states of software applications 102 included in suite 100 and determinations of the current states of software applications 102 included in suite 100 are described in detail herein.

From the determined current states of software applications 102, application shortcut module 104 executing on the user computing device may identify specific access options to include in an application shortcut user interface for the software applications 102. Examples of specific access options and relationships of the specific access options to current states of software applications 102 included in suite 100 are described in detail herein.

A user of a user computing device executing a software application 102 included in suite 100 may be able to access and interact with an application shortcut user interface to gain intuitive, convenient, and/or usable access to any of the software applications 102 included in suite 100, as well as access to current state information about the current state of any of the software applications 102 included in suite 100.

To provide users with opportunity to access software applications 102 included in suite 100, a developer or other entity may publish the software applications 102 to an application server subsystem configured to distribute the software applications 102 to one or more user computing devices for installation and execution on the user computing devices. To illustrate, FIG. 2 shows an exemplary computing system 200 that includes an application server subsystem 202 to which software applications 102 may be published.

Figure 2:
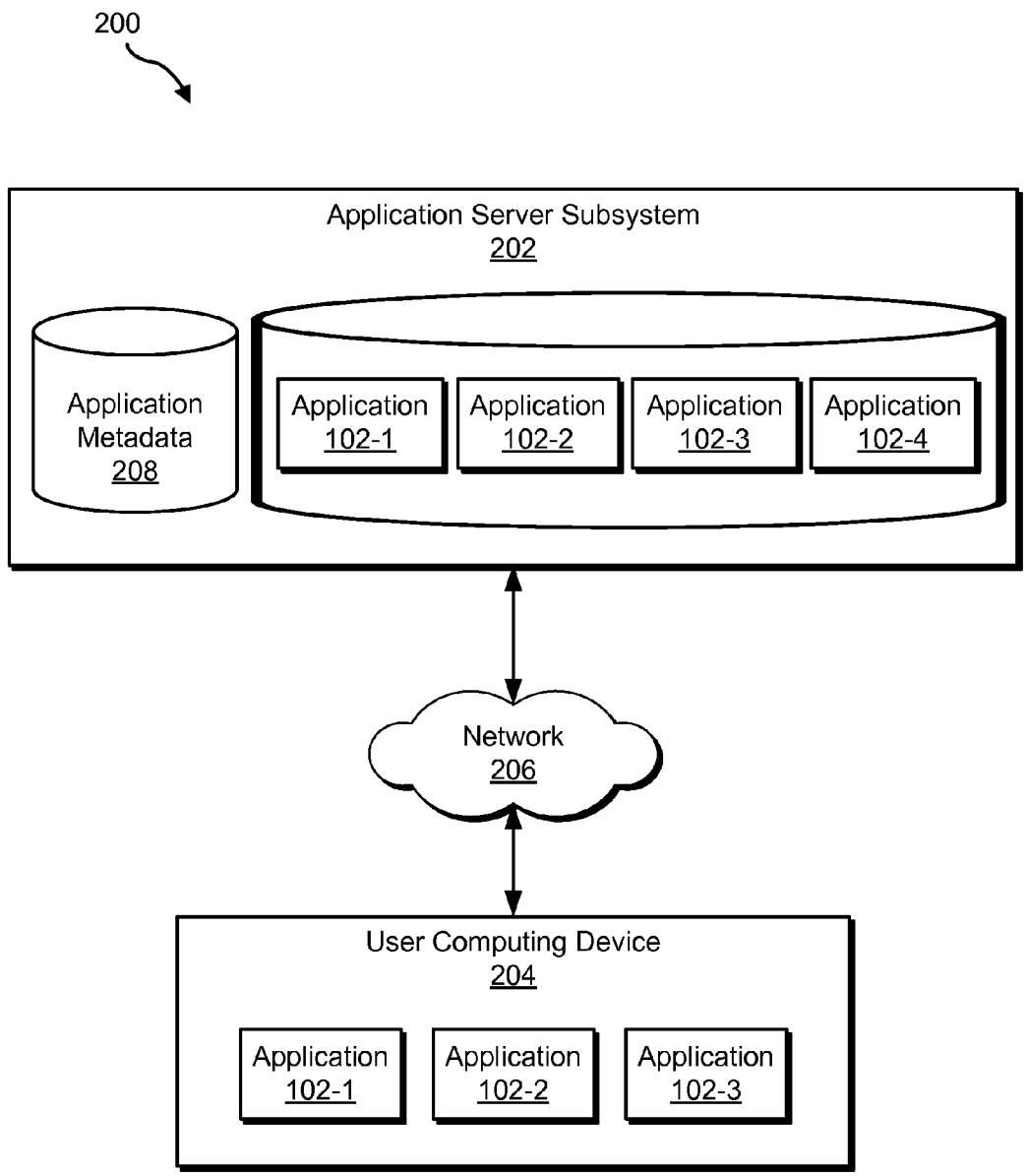
FIG. 2 illustrates an exemplary computing system according to principles described herein.

As shown in FIG. 2, computing system 200 may include application server subsystem 202 and a user computing device 204 configured to communicate with one another by way of a network 206. While FIG. 2 illustrates a single user computing device 204, this is for illustrative purposes only. Application server subsystem 204 may be configured to distribute software applications 102 to any number of user computing devices over network 206.

Application server subsystem 202 may include or be implemented by one or more server-side computing devices controlled by (e.g., operated by) one or more service providers such as one or more software application service providers. User computing device 204 may include or be implemented by one or more client-side computing devices controlled by (e.g., operated by) a user (e.g., an end user of one or more applications and/or services provided by application server subsystem 202). Examples of such devices may include, without limitation, a personal computer, a mobile phone, a smart phone, a tablet computer, a set-top box device, a digital video recorder ("DVR") device, a gaming device, a portable media player device, a mobile computing device, and any other computing device configured to access a service provided by application server subsystem 202 and/or to execute one or more software applications distributed by application server subsystem 202, such as software applications 102 included in suite 100.

Application server subsystem 202 and user computing device 204 may communicate using any suitable remote communications technologies, including any remote communications technologies capable of supporting distribution of software applications by application server subsystem 202 to user computing device 204. Examples of such communication technologies include, without limitation, Global System for Mobile Communications ("GSM") technologies, Long Term Evolution ("LTE") technologies, Code Division Multiple Access ("CDMA") technologies, Time Division Multiple Access ("TDMA") technologies, Evolution Data Optimized Protocol ("EVDO") (e.g., "1xEVDO"), radio frequency ("RF") signaling technologies, radio transmission technologies (e.g., One Times Radio Transmission Technology ("1xRTT")), Transmission Control Protocol ("TCP"), Internet Protocol ("IP"), Session Initiation Protocol ("SIP"), Real-Time Transport Protocol ("RTP"), User Datagram Protocol ("UDP"), Hypertext Transfer Protocol ("HTTP"), Hypertext Transfer Protocol Secure ("HTTPS"), Ethernet, wireless communications technologies, other suitable communications technologies, and any combination or sub-combination thereof.

Application server subsystem 202 may distribute, and user computing device 204 may access, software applications 102 by way of network 206. Network 206 may include any network or combination of networks provided by one or more appropriately configured network devices (and communication links thereto) and over which communications and data (e.g., software application data and/or software application metadata) may be transported between application server subsystem 202 and user computing device 204. For example, network 206 may include, but is not limited to, a mobile phone network (e.g., a cellular phone network, a 3G network, a 4G network, etc.), a satellite media network (e.g., a broadcasting network, a terrestrial media broadcasting network, etc.), a media content distribution network (e.g., a subscriber television network, a media broadcasting, multicasting, and/or narrowcasting network, etc.), a telecommunications network, the Internet, a wide area network, any other network capable of transporting communications and data between application server subsystem 202 and user computing device 204, and/or any combination or sub-combination thereof.

In the example illustrated in FIG. 2, software applications 102 included in suite 100 have been published to application server subsystem 202 for distribution by application server subsystem 202 over network 206. Application server subsystem 202 stores data representative of the software applications 102 and is configured to transmit data representative of the software applications 102 over network 206 for access (e.g., download) by user computing device 204. In addition, application server subsystem 202 stores application metadata 208 for software applications 102. Application metadata 208 may include any data descriptive of software applications 102, including data representative of identifiers for the software applications 102 (e.g., names and/or ID numbers for the software applications 102) and version information for software applications 102. For example, application metadata 208 may specify the specific version of each software application 102 that is available for access from application server subsystem 202. The version of each software application 102 that is available for access from application server subsystem 202 may be the "newest" or "latest" version of the software application 102 that has been published to computing system 200.

User computing device 204 may be configured to access any of the software applications 102 from application server subsystem 202 by way of network 206. For example, user computing device 204 may be configured to download any of the software applications 102 from application server subsystem 202 by way of network 206, install the downloaded software application(s) 102 on user computing device 204, and execute the installed software application(s) 102 on user computing device 204. In the specific example illustrated in FIG. 2, software applications 102-1, 102-2, 102-3, and 102-4 are available for download from application server subsystem 202, and user computing device 204 has downloaded and installed software applications 102-1, 102-2 and 102-3, but not software application 102-4.

Figure 3:
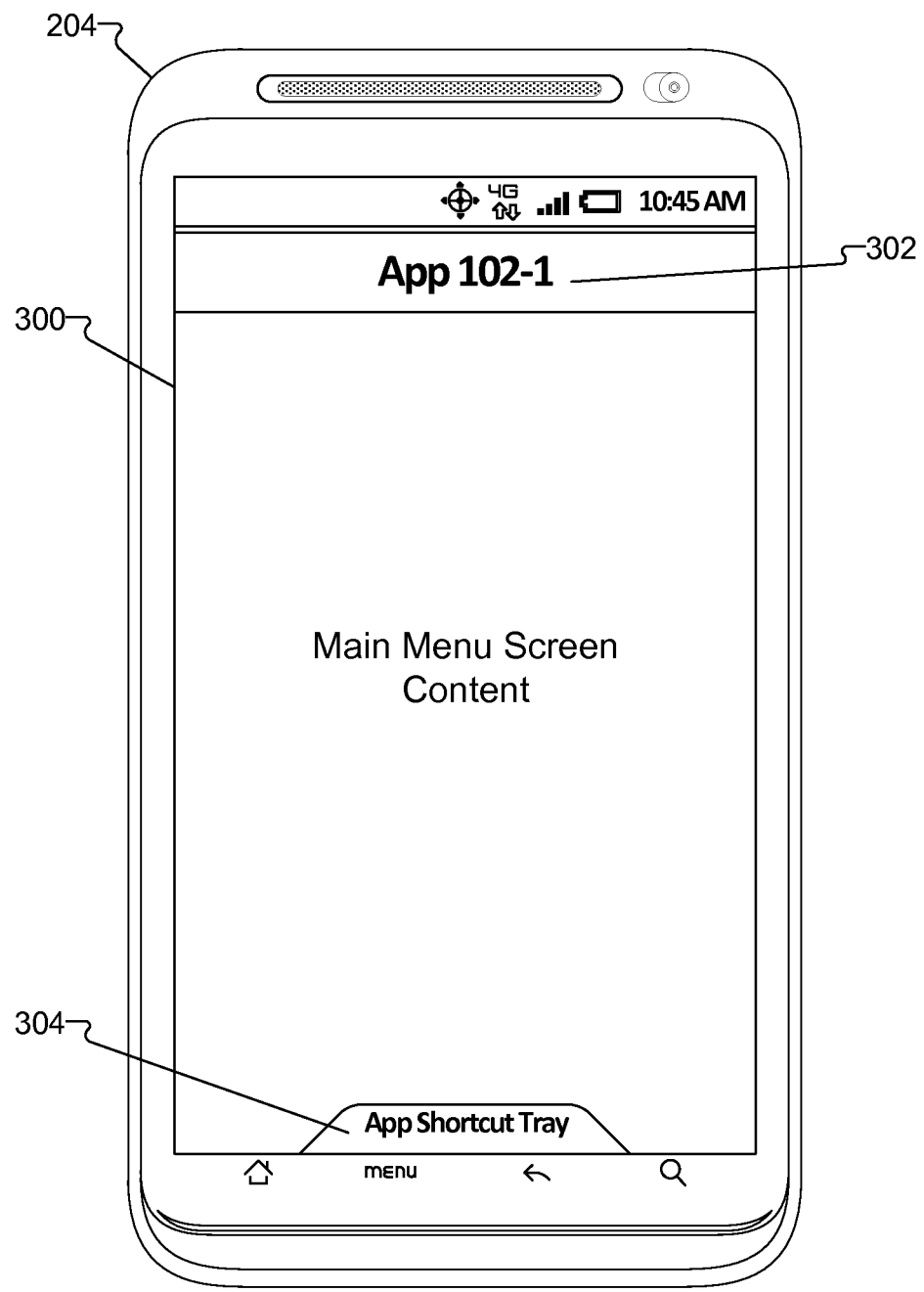
FIG. 3 illustrates an exemplary application graphical user interface according to principles described herein.

When software application 102-1 is launched and executing on user computing device 204, software application 102-1 may direct user computing device 204 to provide a user interface associated with software application 102-1 for presentation to a user of user computing device 204. To illustrate, FIG. 3 shows user computing device 204 displaying a GUI 300 associated with software application 102-1 on a display screen of user computing device 204. GUI 300 may represent any application GUI provided by user computing device 204 at the direction of software application 102-1. In the illustrated example, GUI 300 represents a "main menu" screen of software application 102-1. GUI 300 may include a header 302 indicating that GUI 300 is associated with software application 102-1.

GUI 300 may further include a user selectable option such as a user selectable tab 304 displayed together with the main menu screen (or together with any other application GUI screen associated with software application 102-1) on the display screen of user computing device 204. Tab 304, which may be provided by user computing device 204 as directed by application shortcut module 104-1 included in software application 102-1, may be selected by a user of user computing device 204 to request access to an application shortcut user interface (which may be referred to as an "application shortcut tray" or "app tray" in some examples). In response to a user selection of tab 304, application shortcut module 104-1 may direct user computing device 204 to generate and provide an application shortcut user interface for presentation to the user of user computing device 204.

In order to generate the application shortcut user interface, application shortcut module 104-1 may determine current states of software applications 102 included in suite 100 relative to user computing device 204. The current states of software applications 102 relative to user computing device 204 may include any of the examples of current states of software applications 102 described herein and may be determined by application shortcut module 104-1 in any suitable way.

To illustrate, application shortcut module 104-1 may direct user computing device 204 to access and/or maintain application metadata 208 for software applications 102 included in suite 100. For example, application shortcut module 104-1 may direct user computing device 204 to request and retrieve application metadata 208 from application server subsystem 202. The request may be performed at any suitable time and/or in response to any suitable predetermined event. For example, the request may be performed in response to software application 102-1 being launched on user computing device 204, in response to a user selection of tab 304, in response to a notification from application server subsystem 202 (e.g., a notification indicating that an update to application metadata 208 is available), and/or periodically at a predetermined frequency. Additionally or alternatively, application server subsystem 202 may be configured to push updates made to application metadata 208 at application server subsystem 202 to user computing device 204 for receipt and use by application shortcut module 104-1. After application metadata 208 is received by user computing device 204, application shortcut module 104-1 has access to information about software applications 102 included in suite 100, such as information identifying each software application 102 included in suite 100 and the latest version of each software application 102 that is available for access from application server subsystem 202.

In addition, application shortcut module 104-1 may poll, within user computing device 204, software applications 102 included in suite 100 for current state information. For example, application shortcut module 104-1 may identify, from application metadata 208, each of the software applications 102 included in suite 100. Application shortcut module 104-1 may attempt to communicate, within user computing device 204, with each of the other software applications 102 (i.e., software applications 102 other than software applications 102-1 in which application shortcut module 104-1 is implemented) included in suite 100. Application shortcut module 104-1 may be configured to use any suitable communication technologies to attempt to communicate with and request current state information from the other software applications 102 included in suite 100.

Any of the other software applications 102 included in suite 100 and installed on user computing device 204 may receive and respond to the polling request initiated by application shortcut module 104-1. For example, application shortcut modules 104-2 and 104-3 respectively included in software applications 102-2 and 102-3 installed on user computing device 204 may receive the polling request from application shortcut module 104-1 and respond by providing current state information for software applications 102-2 and 102-3 to application shortcut module 104-1.

The current state information may include any information about the current states of software applications 102-2 and 102-3 relative to user computing device 204. For example, the current state information may include version information descriptive of the versions of software applications 102-2 and 102-3 currently installed on user computing device 204. Additionally or alternatively, in certain embodiments, the current state information may include information descriptive of the operational states of software applications 102-2 and 102-3 on user computing device 204. For example, the current state information may indicate one or more operations currently being performed or recently performed by software applications 102-2 and 102-3, active alerts and notifications provided by software applications 102-2 and 102-3, and/or any other information descriptive of the operational states of software applications 102-2 and 102-3 on user computing device 204.

Application shortcut module 104-1 may be configured to use the retrieved application metadata 208, any current state information received from one or more of the other software applications 102 included in suite 100, and/or current state information for software application 102-1 maintained by software application 102-1 to determine the current states of software applications 102 included in suite 100 relative to user computing device 204. Application shortcut module 104-1 may be further configured to use non-responsiveness of any of the other software applications 102 included in suite 100 to determine the current states of software applications 102 included in suite 100 relative to user computing device 204. To illustrate, in the example shown in FIG. 2, software application 102-4 is not installed on user computing device 204. Accordingly, application shortcut module 104-1 may not receive a response from software application 102-4 to the polling request issued by application shortcut module 104-1 within user computing device 204. Based on the lack of response from software application 102-4, application shortcut module 104-1 may determine that software application 102-4 is not currently installed on user computing device 204.

In certain examples, the current states of software applications 102 included in suite 100 may comprise current integration states of the software applications 102 relative to user computing device 204, such as current levels of integration of the software applications 102 relative to user computing device 204. Examples of levels of integration relative to user computing device 204 may include, without limitation, a level of integration indicative of a software application 102 that is currently installed and up-to-date on user computing device 204 (i.e., the latest version of the software application 102 available from application server subsystem 202 is currently installed on user computing device 204), a level of integration indicative of a software application 102 that is currently installed and outdated on user computing device 204 (i.e., the version of the software application 102 currently installed on user computing device 204 is not the latest version of the software application 102 available from application server subsystem 202), and a level of integration indicative of a software application 102 that is not currently installed on user computing device 204 and is available for download from application server subsystem 202. These exemplary levels of integration may be referred to as an "installed and up-to-date" level of integration, an "installed and outdated" level of integration, and a "not-installed" level of integration, respectively. These exemplary levels of integration are illustrative only. Additional and/or alternative levels of integration may be used in other embodiments.

Application shortcut module 104-1 may be configured to use the application metadata 208 retrieved from application server subsystem 202 and/or any current state information received or not received from one or more software applications 102 included in suite 100 to determine the levels of integration of software applications 102 included in suite 100 relative to user computing device 204. The determination may include comparing the application metadata 208 retrieved from application server subsystem 202 to any current state information received from one or more software applications 102 included in suite. For instance, version information for software applications 102 may be compared to determine whether a version of a software application 102 installed on user computing device 204 is up-to-date with the latest version of the software application 102 that is available from application server subsystem 202.

Figure 4A:
FIGS. 4A-4B illustrate exemplary data tables according to principles described herein.

To illustrate, FIG. 4A shows a table 400 that includes data representative of current integration states of software applications 102 included in suite 100 relative to user computing device 204 for the example illustrated in FIG. 2. As shown, for software application 102-1, version 1.0 of software application 102-1 is currently installed on user computing device 204 and matches the latest version of the software application 102-1 that is available from application server subsystem 202. Accordingly, the current integration state of software application 102-1 is an "installed and up-to-date" level of integration. Likewise, the current integration state of software application 102-2 relative to user computing device 204 is an "installed and up-to-date" level of integration because the version of software application 102-2 currently installed on user computing device 204 matches the latest version of the software application 102-2 that is available from application server subsystem 202. For software application 102-3, version 2.0 of software application 102-3 is currently installed on user computing device 204, and a later version 2.1 of software application 102-3 is available from application server subsystem 202. Accordingly, the current integration state of software application 102-3 is an "installed and outdated" level of integration. For software application 102-4, no version of software application 102-4 is currently installed on user computing device 204, and version 1.0 of software application 102-4 is currently available for access from application server subsystem 202. Accordingly, the current integration state of software application 102-4 is a "not-installed" level of integration.

Application shortcut module 104-1 may be configured to identify, based on the determined current states of software applications 102 included in suite 100 relative to user computing device 204, one or more access options for software applications 102. To this end, specific access options may be associated with certain current states (e.g., current integration states) of software applications 102. Application shortcut module 104-1 may be configured to maintain data that maps current states of software applications 102 relative to user computing device 204 to specific access options.

Figure 4B:
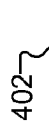

For example, FIG. 4B illustrates a table 402 that maps levels of integration to specific access options. As shown, in certain examples, an "installed and up-to-date" level of integration may be mapped to a "launch application" access option, an "installed and outdated" level of integration may be mapped to an "update application" access option, and a "not-installed" level of integration may be mapped to a "download/install application" access option. Accordingly, application shortcut module 104-1 may use table 402 to identify specific access options for software applications 102 based on the determined levels of integration of the software applications 102 relative to user computing device 204.

Figure 5:
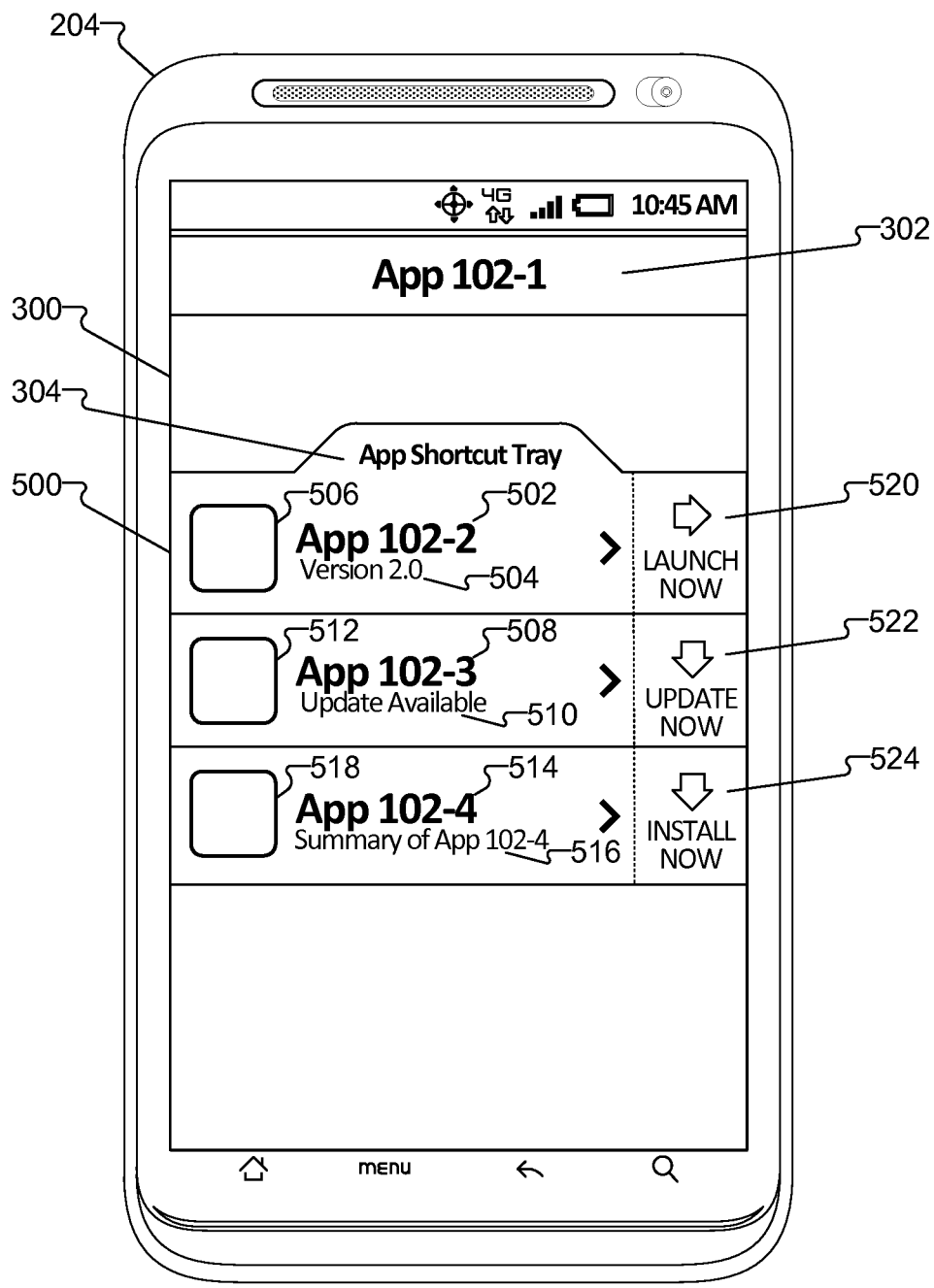
FIGS. 5-11 illustrate exemplary graphical user interfaces according to principles described herein.

After current states and access options for software applications 102 included in suite 100 are determined such as described above, application shortcut module 104-1 may direct user computing device 204 to generate and provide an application shortcut user interface for presentation to the user of user computing device 204. The application shortcut user interface may include the identified access options configured to be selected by the user of user computing device 204 to access software applications 102 included in suite 100. To illustrate, FIG. 5 shows an exemplary application shortcut GUI 500 that may be displayed by user computing device 204 in response to a user selection of tab 304 shown in FIG. 3. In certain examples, the display of application shortcut GUI 500 may be animated to appear as a tray sliding up from the bottom of the display screen of user computing device 204. The specific examples of tab 304 and application shortcut GUI 500 shown in FIGS. 3 and 5 are illustrative only. Other visual representations and/or implementations of tab 304 and application shortcut GUI 500 may be used in other embodiments.

In the example illustrated in FIG. 5, application shortcut GUI 500 covers a portion of GUI 300 such that another portion of GUI 300 remains visible to a user of user computing device 204. For example, header 302 of GUI 300 remains visible and visually indicates that GUI 300 is associated with software application 102-1 from which application shortcut GUI 500 is launched by user selection of tab 304 in FIG. 3.

Application shortcut GUI 500 may include graphical data descriptive of each of the other software applications 102 included in suite 100 (i.e., software applications 102 other than software application 102-1 from which application shortcut GUI 500 is launched). For software application 102-2, for example, application shortcut GUI 500 includes an identifier 502 such as a name of software application 102-2, version information 504 for software application 102-2 (i.e., information indicating the version of software application 102-2 currently installed on user computing device 204), and a thumbnail image 506 associated with software application 102-2. For software application 102-3, application shortcut GUI 500 includes an identifier 508 of software application 102-3, update information 510 indicating that an update is available for software application 102-3, and a thumbnail image 512 associated with software application 102-3. For software application 102-4, application shortcut GUI 500 includes an identifier 514 for software application 102-4, a summary description 516 of software application 102-4, and a thumbnail image 518 associated with software application 102-4.

Application shortcut GUI 500 may further include graphical objects representing access options for the other software applications 102 represented in application shortcut GUI 500. For example, as illustrated in FIG. 5, application shortcut GUI 500 may include a graphical object 520 representing an access option for launching software application 102-2, a graphical object 522 representing an access option for updating software application 102-3, and a graphical object 524 representing an access option for downloading and installing software application 102-4 on user computing device 204. Each of the specific access options represented in FIG. 5 may be identified by application shortcut module 104-1, as described above, for inclusion in application shortcut GUI 500 based on the determined current levels of integration of software applications 102-2, 102-3, and 102-4 relative to user computing device 204. Accordingly, application shortcut GUI 500 provides a user of user computing device 204 with access options configured to be selected by the user to launch software application 102-2 (which is installed and up-to-date on user computing device 204), update software application 102-3 (which is installed and outdated on user computing device 204), and download and install software application 102-4 (which is not installed on user computing device 204).

In response to a user selection of graphical object 520 (and therefore the associated access option) in FIG. 5, user computing device 204 may launch software application 102-2. If an instance of software application 102-2 is already executing on computing device 204 when graphical object 520 is selected by the user, user computing device 204 may launch software application 102-2 by switching from the currently executing instance of software application 102-1 to the instance of software application 102-2 that is executing on user computing device 204 such that an application user interface associated with software application 102-2 is presented by user computing device 204. If an instance of software application 102-2 is not being executed on user computing device 204 when the user selects graphical object 520, user computing device 204 may launch software application 102-2 by instantiating a new instance of software application 102-2 and presenting an application user interface associated with the new instance of software application 102-2.

Figure 6:
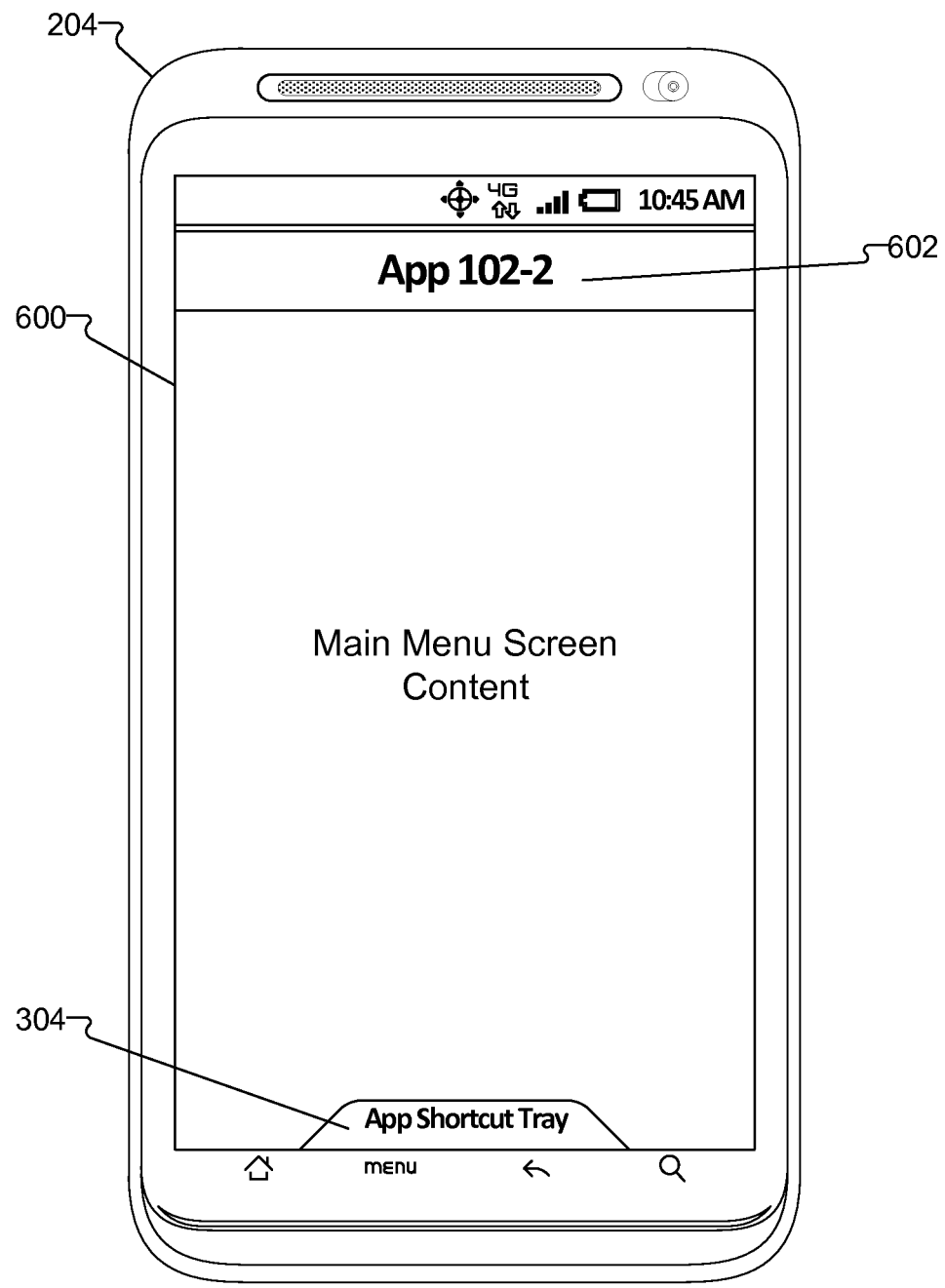

Accordingly, in response to user selection of graphical object 520, user computing device 204 may switch from presenting application shortcut GUI 500 within the context of software application 102-1 to presenting an application user interface associated with software application 102-2. To illustrate, FIG. 6 shows user computing device 204 displaying a GUI 600 associated with software application 102-2 on the display screen of user computing device 204, as indicated by a header 602 of GUI 600. GUI 600 may represent any application GUI provided by user computing device 204 at the direction of software application 102-2. In the illustrated example, GUI 600 represents a "main menu" screen of software application 102-2. In cases in which a launch of software application 102-2 includes switching to an already executing instance of software application 102-2 on user computing device 204, user computing device 204 may display an application GUI associated with the executing instance of the software application 102-2. In cases in which the launch of software application 102-2 includes instantiating a new instance of software application 102-2, user computing device 204 may display an initial application GUI associated with software application 102-2, such as a "home" or "main menu" screen of software application 102-2.

As shown in FIG. 6, user computing device 204 may display tab 304 together with GUI 600 on the display screen of user computing device 204. Accordingly, a user of user computing device 204 may select tab 304 to launch an application shortcut user interface from within software application 102-2. In certain embodiments, the application shortcut user interface launched from within software application 102-2 may have attributes consistent with an application shortcut user interface launched from with software application 102-1 or any other software application 102 included in suite 100. However, certain attributes may be from the perspective of the launching software application 102, such as from the perspective of software application 102-2 rather than software application 102-1.

Figure 7:
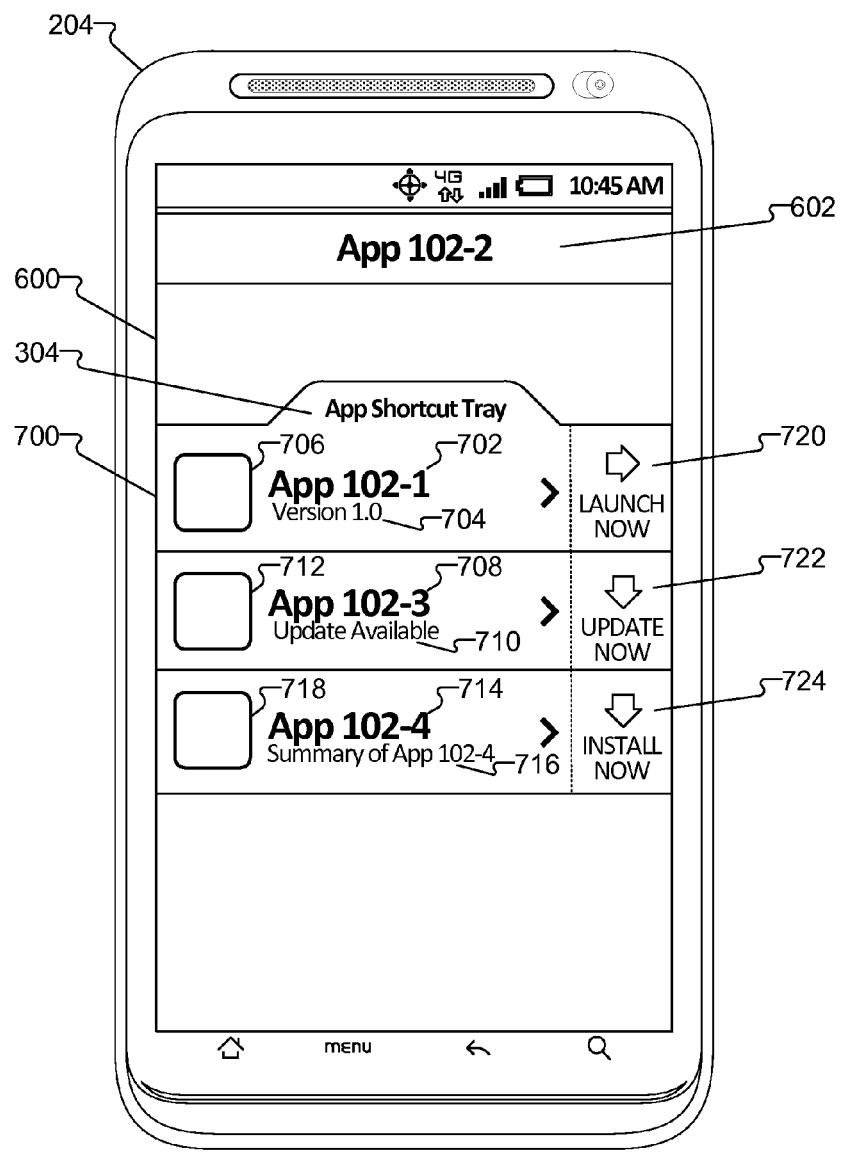

To illustrate, in response to a user selection of tab 304 shown in FIG. 6, application shortcut module 104-2 implemented by software application 102-2 may direct user computing device 204 to generate and provide, from the perspective of software application 102-2, an application shortcut user interface for presentation to the user of user computing device 204. To illustrate, FIG. 7 shows an exemplary application shortcut GUI 700 that may be displayed by user computing device 204 in response to a user selection of tab 304 shown in FIG. 6. Application shortcut GUI 700 may be similar to application shortcut GUI 500, except that application shortcut GUI 700 is generated from the perspective of software application 102-2 instead of software application 102-1.

As shown in FIG. 7, application shortcut GUI 700 may include graphical data descriptive of each of the other software applications 102 included in suite 100 (i.e., software applications 102 other than software application 102-2 from which application shortcut GUI 700 is launched). For software application 102-1, for example, application shortcut GUI 700 includes an identifier 702 such as a name of software application 102-1, version information 704 for software application 102-1 (i.e., information indicating the version of software application 102-1 currently installed on user computing device 204), and a thumbnail image 706 associated with software application 102-1. For software application 102-3, application shortcut GUI 700 includes an identifier 708 of software application 102-3, update information 710 indicating that an update is available for software application 102-3, and a thumbnail image 712 associated with software application 102-3. For software application 102-4, application shortcut GUI 700 includes an identifier 714 for software application 102-4, a summary description 716 of software application 102-4, and a thumbnail image 718 associated with software application 102-4.

Application shortcut GUI 700 may further include graphical objects representing access options for the other software applications 102 represented in application shortcut GUI 700. For example, as illustrated in FIG. 7, application shortcut GUI 700 may include a graphical object 720 representing an access option for launching software application 102-1, a graphical object 722 representing an access option for updating software application 102-3, and a graphical object 724 representing an access option for downloading and installing software application 102-4 on user computing device 204. Each of the specific access options represented in FIG. 7 may be identified by application shortcut module 104-2, as described above, for inclusion in application shortcut GUI 700 based on the determined current levels of integration of software applications 102-1, 102-3, and 102-4 relative to user computing device 204. Accordingly, application shortcut GUI 700 provides a user of user computing device 204 with access options configured to be selected by the user to launch software application 102-1 (which is installed and up-to-date on user computing device 204), update software application 102-3 (which is installed and outdated on user computing device 204), and download and install software application 102-4 (which is not installed on user computing device 204).

Returning to FIG. 5, in response to a user selection of graphical object 522 in application shortcut GUI 500, user computing device 204 may initiate an update of software application 102-3 installed on user computing device 204. In certain examples, the update may include user computing device 204 initiating an update process directly from application shortcut GUI 500. The update process may be performed in any way suitable for updating software application 102-3 installed on user computing device 204. For example, the update process may include user computing device 204 sending a download request for the latest version of software application 102-3 to application server subsystem 202, receiving data representative of the latest version of software application 102-3 from application server subsystem 202, and using the latest version of software application 102-3 to update software application 102-3 on user computing device 204 such that the latest version of software application 102-3 is installed on user computing device 204.

In other examples, a user selection of graphical object 522 may initiate an update of software application 102-3 on user computing device 204 by causing user computing device 204 to access and display an update user interface that is specific to software application 102-3 (as opposed to a generic update user interface that is not specific to software application 102-3). The update user interface may provide the user with information about a recommended update to software application 102-3 and may include an option configured to be selected by the user to launch the update process.

In response to a user selection of graphical object 524 in application shortcut GUI 500, user computing device 204 may initiate a download and installation of software application 102-4 on user computing device 204. In certain examples, the download and installation may include user computing device 204 initiating a download and installation process directly from application shortcut GUI 500. The download and installation process may be performed in any way suitable for download and installing software application 102-4 on user computing device 204. For example, the download and installation process may include user computing device 204 sending a download request for the latest version of software application 102-4 to application server subsystem 202, receiving data representative of the latest version of software application 102-4 from application server subsystem 202, and installing the latest version of software application 102-4 on user computing device 204.

In other examples, a user selection of graphical object 524 may initiate a download and installation of software application 102-4 on user computing device 204 by causing user computing device 204 to access and display a download user interface that is specific to software application 102-4 (as opposed to a generic download user interface that is not specific to software application 102-4). The download user interface may provide the user with information about software application 102-4 and may include an option configured to be selected by the user to launch the download and installation process to install software application 102-4 on user computing device 204.

User computing device 204 may function similarly in response to a user selection of graphical object 722 or 724 in GUI 700 shown in FIG. 7 to update software application 102-3 or download and install software application 102-4 on user computing device 204.

In any of the ways described above, a user of user computing device 204 may be provided with capability, through an application shortcut user interface, to access any software application 102 included in suite 100 from within any other software application 102 included in suite 100. This provides the user with convenient and/or useful discoverability and/or access tools that may be used by the user to discover and/or access any of the software applications 102 in suite 100, without the user having to navigate away from one of the software applications 102 to a separate, dedicated software application discoverability or access user interface location, such as a software application storefront.

In certain alternative embodiments, an application shortcut module 104 may be implemented in an independent software application not included in suite 100. For example, an application shortcut module 104 may be implemented as a widget on user computing device 204 such that a user of user computing device 204 may launch and use the widget to access an application shortcut user interface through which the user may discover and access any of the software applications 102 included in suite 100, such as in any of the ways described herein.

An application shortcut user interface, such as any of those illustrated herein, may include data representative of software applications 102 included in suite 102 and corresponding access options presented to a user in any suitable way. For example, an application shortcut module 104 may be configured to present data representative of software applications 102 included in suite 100 and corresponding access options in any suitable presentation order, which order may be determined by application shortcut module 104 based on one or more predefined criteria, such as current states of the software applications 102.

To illustrate, application shortcut GUI 500 shown in FIG. 5 illustrates a particular ordered presentation of data representative of software applications 102-2, 102-3, and 102-4. The illustrated order of presentation of software applications 102-2, 102-3, and 102-4 may be determined by application shortcut module 104-1 based on the determined current states of software applications 102-2, 102-3, and 102-4. For example, application shortcut module 104-1 may be configured to display data representative of any software applications 102 that are installed and up-to-date on user computing device 204 first in order of presentation, followed by any software applications 102 that are installed and outdated on user computing device 204, followed by any software applications 102 that are not currently installed on user computing device 204. Application shortcut GUI 500 shown in FIG. 5 illustrates an example of this particular presentation order. However, any other suitable presentation order may be used as may suit a particular implementation.

For example, in certain embodiments, application shortcut module 104-1 may be configured to present, in application shortcut GUI 500, data representative of software applications 102 that are currently installed on user computing device 204 before data representative of software applications 102 that are not currently installed on user computing device 204. Alternatively, application shortcut module 104-1 may be configured to graphically differentiate installed and not-installed software applications 102 in another way within application shortcut GUI 500.

Figure 8:
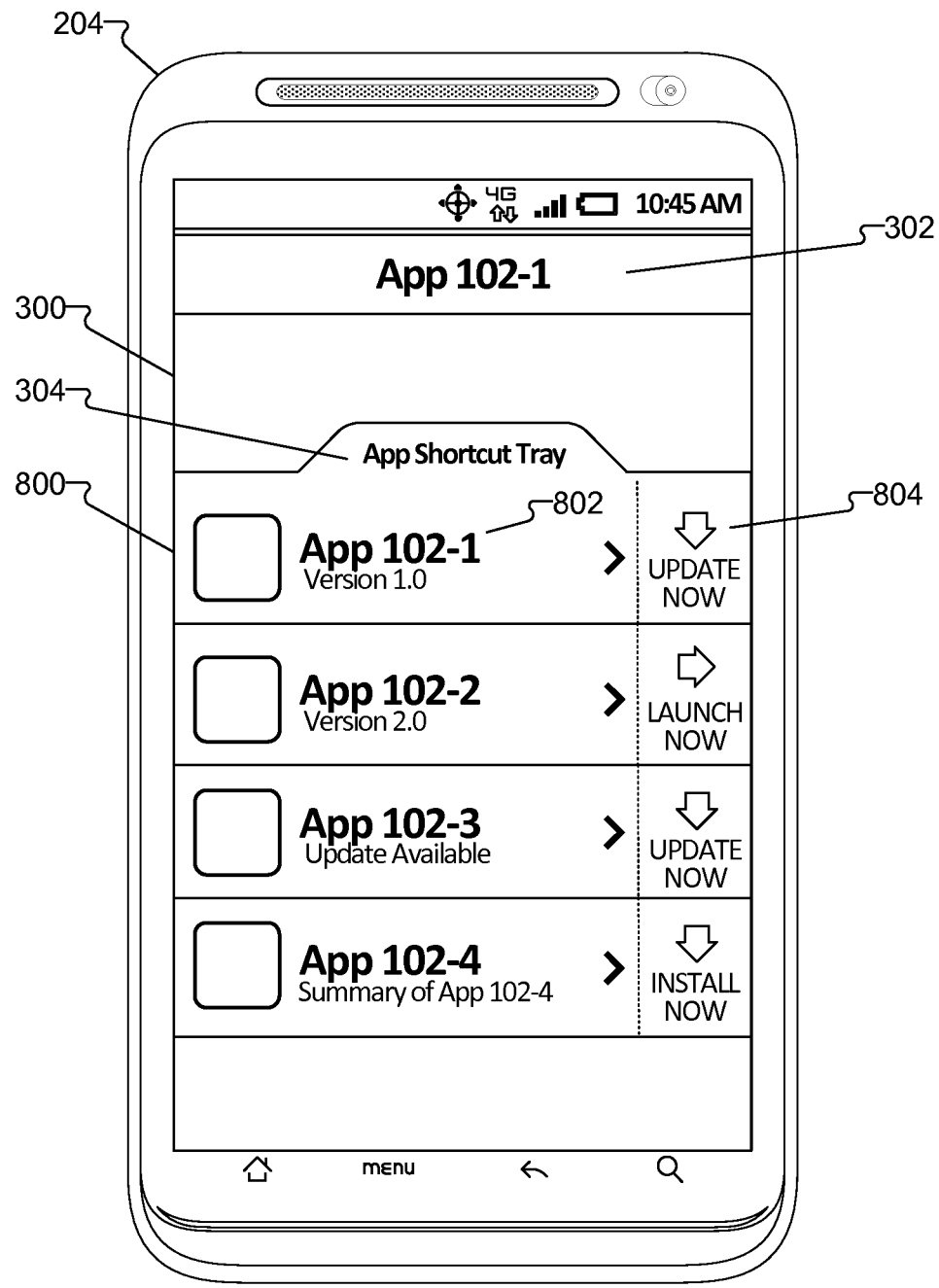

As another example, in FIG. 5, data representative of software application 102-1 is not included in application shortcut GUI 500. In alternative examples, data representative of software application 102-1 may be included in application shortcut GUI 500. To illustrate, application shortcut module 104-1 may be configured to selectively insert data representative of software application 102-1 in application shortcut GUI 500 in response to software application 102-1 having a predetermined current state. For example, application shortcut module 104-1 and may be configured to insert data representative of software application 102-1 in application shortcut GUI 500 in response to application shortcut module 104-1 determining that software application 102-1 has an "installed and outdated" level of integration relative to user computing device 204. In certain embodiments, in response to this determination, application shortcut module 104-1 may display data representative of software application 102-1 at the top of the list of software applications 102 represented in application shortcut GUI 500. In addition, application shortcut module 104-1 may display a graphical object representative of an access option that may be selected by the user to initiate an update of software application 102-1 on user computing device 204. To illustrate, FIG. 8 shows an exemplary application shortcut GUI 800 having data 802 representative of software application 102-1 and a graphical object 804 representative of a selectable option to update software application 102-1 on user computing device 204 presented at the top of a list of software applications 102 represented in application shortcut GUI 800.

As another example, in certain embodiments, application shortcut module 104-1 may be configured to present, in application shortcut GUI 500, data representative of software applications 102 included in suite 100 in an order that is determined based on historical access of the software applications 102 on user computing device 204. For example, more recently accessed software applications 102 may be represented earlier in order than less recently accessed software applications 102.

An application shortcut user interface, such as any of the exemplary application shortcut user interfaces described herein, may include data representative of and access options for any suite of software applications. For example, in certain implementations, a suite of software applications may include software applications developed and published by a provider of one or more media content and/or communications services. For instance, an exemplary suite of software applications may include a DVR manager application through which a user may control or otherwise manage a DVR device and/or service, a mobile account management application through which a user may manage a mobile communications subscription account (e.g., by accessing usage data, managing a subscriber plan, paying a bill, managing settings, etc. associated with the mobile communications subscription account), a home account application through which a user may manage a home communications subscription account (e.g., by accessing usage data, managing a subscriber plan, paying a bill, managing settings, etc. associated with the home communications subscription account), a digital voice application through which a user may access and/or manager one or more digital voice communications services (e.g., voicemail, etc.), a home control application through which a user may access and control one or more devices at the user's home or other remote premises, and a media manager application through which a user may upload, access, and manage remotely stored media content (e.g., as part of a media content cloud-based service). This set of exemplary software applications may be referred to as a "suite of service provider applications."

Figure 9:
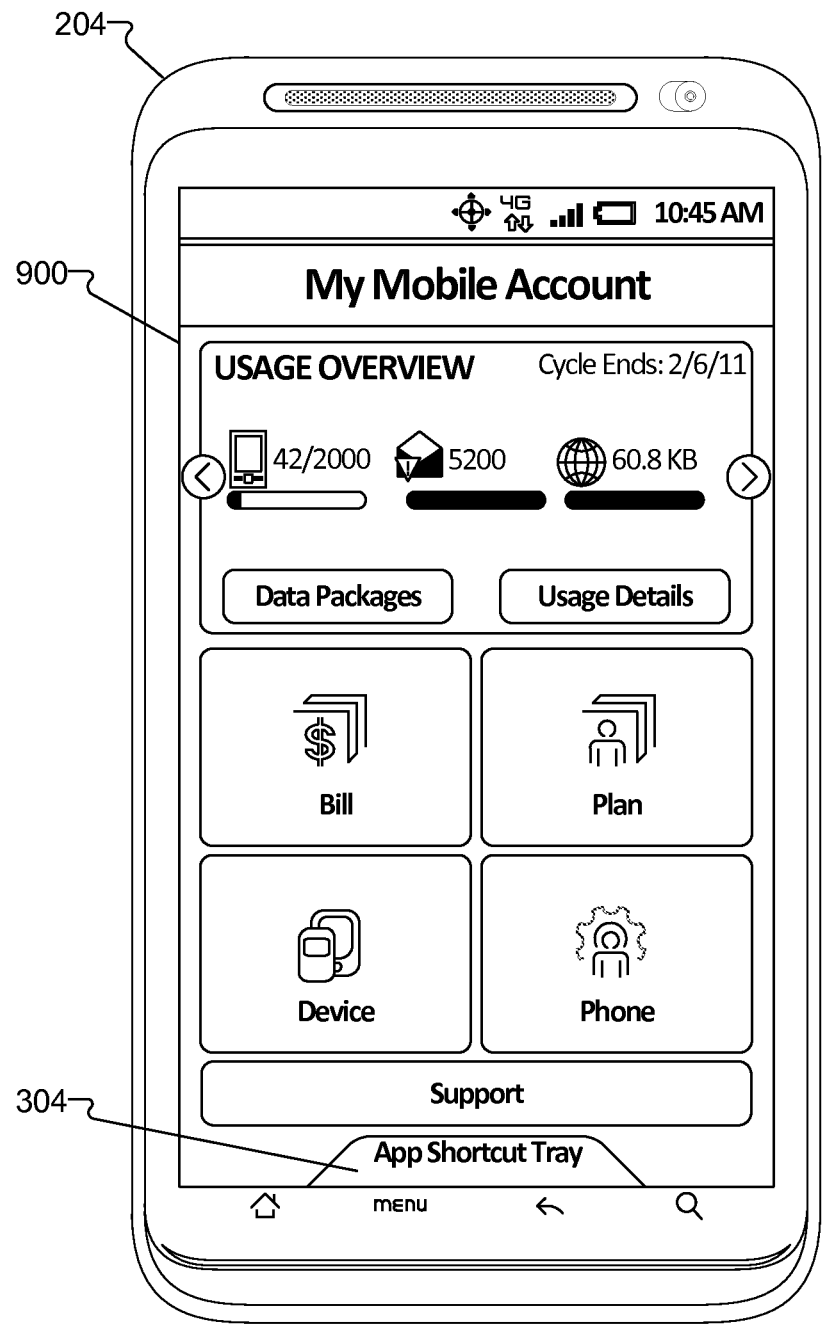
Figure 10:
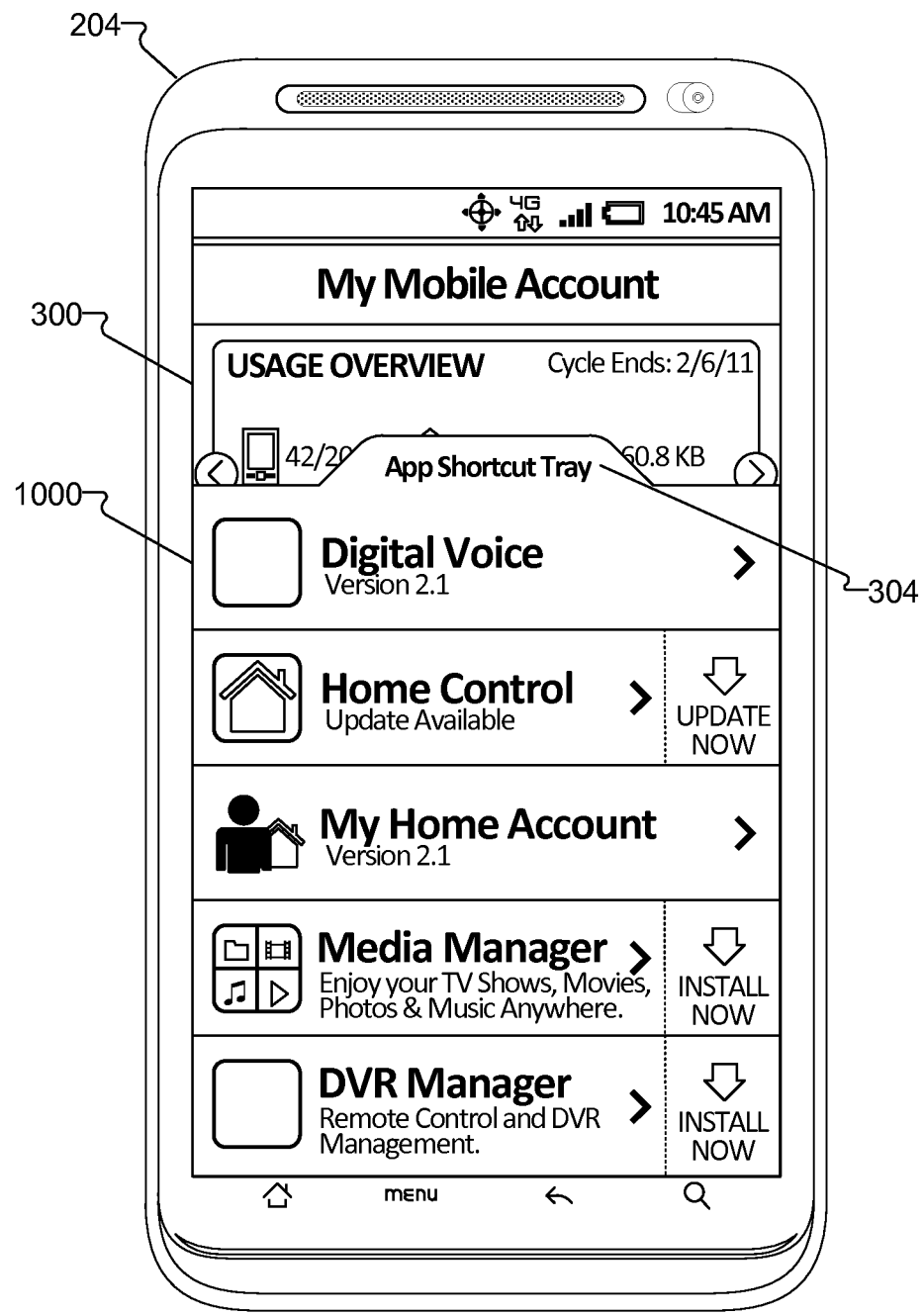

FIGS. 9-10 illustrate exemplary user interfaces that may be associated with the exemplary suite of service provider software applications. In FIG. 9, a mobile account software application (e.g., "My Mobile Account" software application) directs user computing device 204 to display an application GUI 900 associated with the mobile account software application. As shown, application GUI 900 may include content associated with management of a mobile service subscriber account. In addition, user computing device 204 may display tab 304 within or together with application GUI 900 on the display screen of user computing device 204. In response to a user selection of tab 304, user computing device 204 may display application shortcut GUI 1000 on the display screen as shown in FIG. 10. As shown, application shortcut GUI 1000 may include data representative of the other software applications (i.e., other than the mobile account software application from which application shortcut GUI 1000 is launched) included in the suite of service provider software applications and graphical objects representing access options for the other software applications. In particular, application shortcut GUI 1000 includes data representative of a digital voice, home control, home account, media manager, and DVR manager software applications and corresponding access options.

Figure 11:
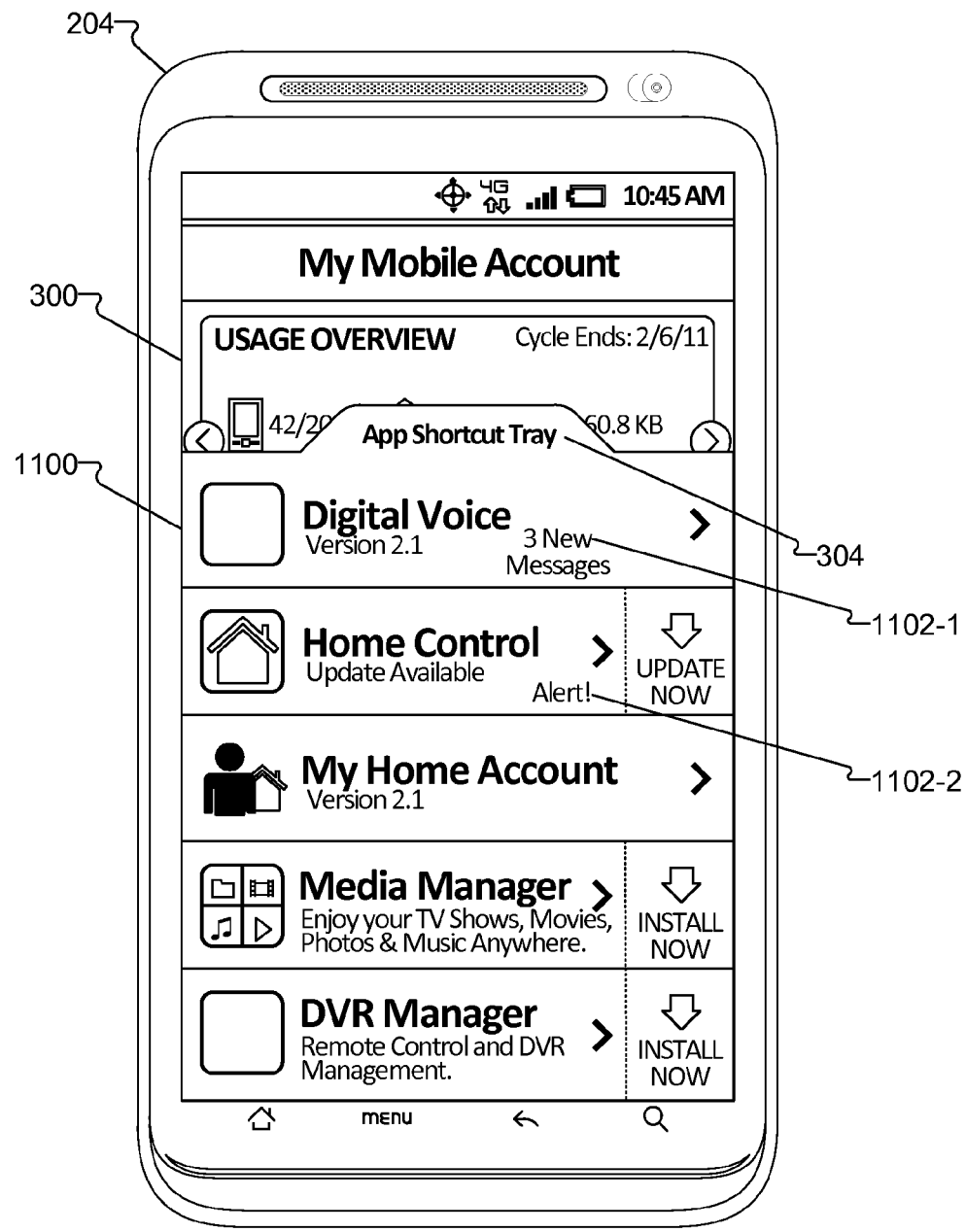

As mentioned above, current states of software applications may include operational states of the software applications. An application shortcut user interface may indicate operational states of software applications and provide access options associated with the operational states. To illustrate, FIG. 11 shows an application shortcut GUI 1100 that is similar to application shortcut GUI 1000 and additionally includes data representative of operational states of software applications and access options associated with the operational states of the software applications. For instance, application shortcut GUI 1100 includes graphical objects 1102 (e.g., graphical objects 1102-1 and 1102-2) representing operational states and corresponding access options for software applications included in the suite of service provider software applications.

Graphical object 1102-1 represents an operational state of a "digital voice" application in which the operational state is the digital voice application having three new messages (e.g., voicemail messages) available for access by the user. Graphical object 1102-1 may be selectable by the user to access the digital voice application and the three new messages. In response to a user selection of graphical object 1102-1, user computing device 204 may launch the digital voice application and present an application user interface through which the user is able to access the three new messages.

Graphical object 1102-2 represents an operational state of a "home control" application in which the operational state is the home control application having issued an alert (e.g., an alert triggered by a predefined condition in the home or other customer premises). Graphical object 1102-2 may be selectable by the user to access the home control application and information and/or options related to the alert. In response to a user selection of graphical object 1102-2, user computing device 204 may launch the home control application and present an application user interface through which the user is able to access the information and/or options related to the alert. For example, the application user interface may include a display of a remote camera view of a location at the user's home and associated with the alert (e.g., of a particular room within the home).

As mentioned, operational states of software applications may be determined from operational state information received by an application shortcut module 104 in response to a polling request issued by the application shortcut module 104. To facilitate the providing of operational state information to a requesting application shortcut module 104, each application shortcut module 104 may be configured to obtain operational state information from the software application 102 implementing the application shortcut module 104 and to provide the operational state information in response to a polling request.

In certain embodiments, each application shortcut module 104 may be configured rely on existing data refresh policies of the software applications 102 and to avoid or minimize forcing any additional refresh operations. For example, when requesting operational state information from a digital voice application, an application shortcut module 104 may request that the digital voice application provide the current state information and may receive current state information indicating that digital voice application has three new messages awaiting user access. Application shortcut module 104 may be configured to trust the data refresh policies of the digital voice application and not force the digital voice application to issue real-time data refresh call to a digital voice server to check whether this information is up-to-date. Accordingly, the digital voice application may refresh its own operational state information in accordance with its own policy, and the application shortcut module 104 may rely on digital voice application to provide operational state information that is current based on the refresh policy of the digital voice application. This may help avoid adding additional burden to the server that serves the digital voice application and to any other servers that serve the other software applications included in the suite of service provider software applications.

Figure 12:
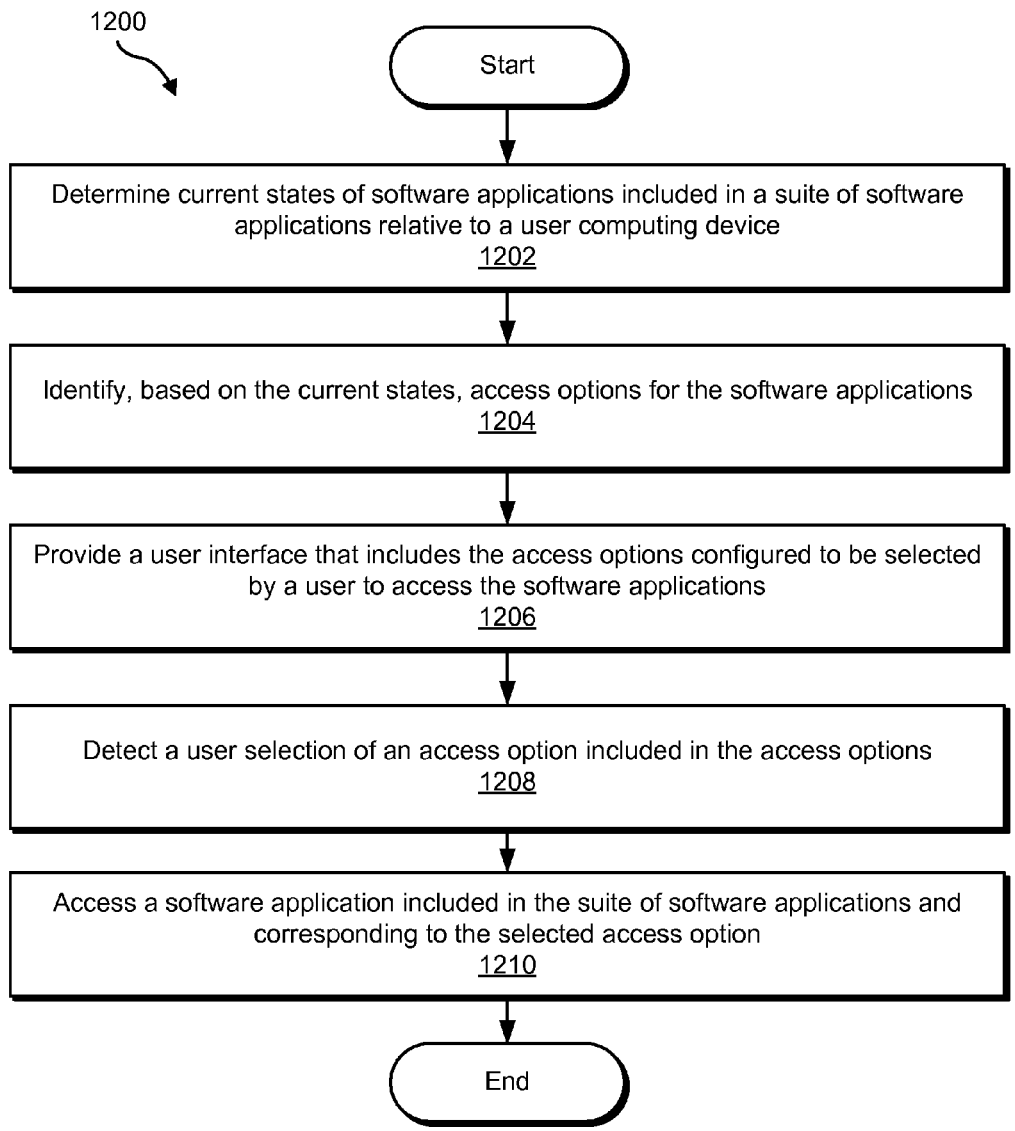
FIGS. 12-13 illustrate exemplary application shortcut user interface methods according to principles described herein.

FIG. 12 illustrates an exemplary application shortcut user interface method 1200. While FIG. 12 illustrates exemplary steps according to one embodiment, other embodiments may omit, add to, reorder, combine, and/or modify any of the steps shown in FIG. 12. One or more of the steps shown in FIG. 12 may be performed by an application shortcut module 104, a software application implementing an application shortcut module 104, and/or a user computing device as directed by an application shortcut module 104 and/or a software application implementing an application shortcut module 104.

In step 1202, a user computing device determines current states of software applications included in a suite of software applications, relative to the user computing device. Step 1202 may be performed in any of the ways described herein. In certain embodiments, the current states may include current integration states and/or current operational states of the software application, such as described herein.

In step 1204, the user computing device identifies, based on the current states, access options for the software applications included in the suite of software applications. Step 1204 may be performed in any of the ways described herein.

In step 1206, the user computing device provides a user interface that includes the access options configured to be selected by a user of the user computing device to access the software applications included in the suite of software applications. Step 1206 may be performed in any of the ways described herein, and the user interface may include any of the exemplary user interfaces illustrated herein.

In step 1208, the user computing device detects a user selection of an access option included in the access options in the user interface. The user selection may be provided by the user and detected by the user computing device in any suitable way, such as by way of one or more touch screen user inputs.

In step 1210, the user computing device accesses a software application included in the suite of software applications and corresponding to the selected access option. Step 1210, which may be performed in response to step 1208, may be performed in any of the ways described herein.

Figure 13:
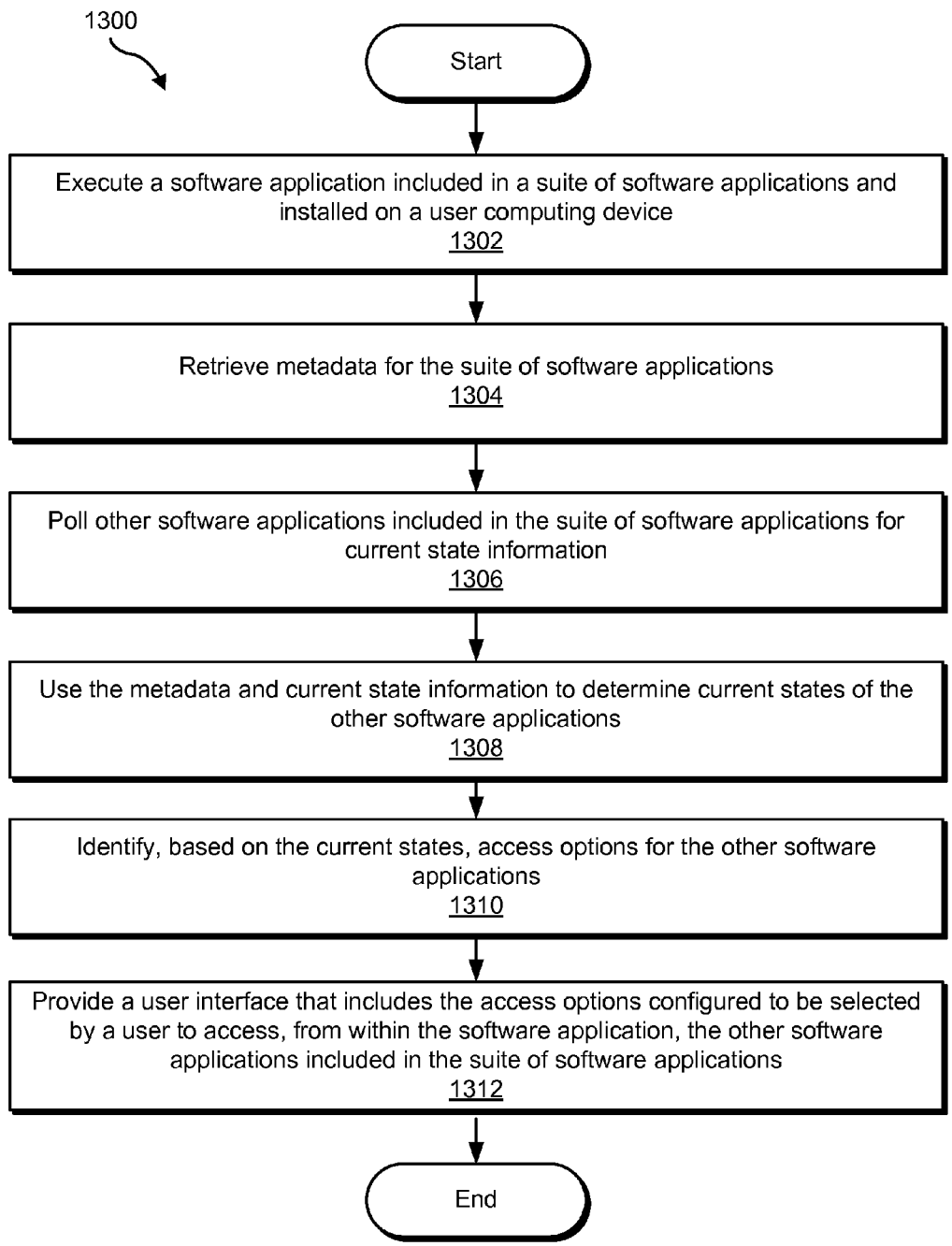

FIG. 13 illustrates another exemplary application shortcut user interface method 1300. While FIG. 13 illustrates exemplary steps according to one embodiment, other embodiments may omit, add to, reorder, combine, and/or modify any of the steps shown in FIG. 13. One or more of the steps shown in FIG. 13 may be performed by an application shortcut module 104, a software application implementing an application shortcut module 104, and/or a user computing device as directed by an application shortcut module 104 and/or a software application implementing an application shortcut module 104.

In step 1302, a user computing device executes a software application included in a suite of software applications and installed on the user computing device. Step 1302 may be performed in any of the ways described herein.

In step 1304, the user computing device retrieves metadata for the suite of software applications. For example, the user computing device may retrieve the metadata from application server subsystem 202, such as described herein.

In step 1306, the user computing device polls other software applications included in the suite of software applications for current state information. For example, the software application executing on the computing device may direct the user computing device to poll, within the user computing device, other software applications included in the suite of software applications, such as by sending a polling request within the user computing device to attempt to communicate with the other software applications included in the suite of software applications, such as described herein.

In step 1308, the user computing device uses the metadata and current state information to determine current states of the other software applications included in the suite of software applications. Step 1308 may be performed in any of the ways described herein.

In step 1310, the user computing device identifies, based on the current states, access options for the other software applications included in the suite of software applications. Step 1310 may be performed in any of the ways described herein.

In step 1312, the user computing device provides a user interface that includes the access options configured to be selected by a user of the user computing device to access, from within the software application executing on the user computing device, the other software applications included in the suite of software applications. The user interface, which may include any of the exemplary user interfaces illustrated herein, may further indicate the current states of the other software applications included in the suite of software applications.

While method 1300 has been described from the perspective of a particular software application included in a suite of software applications, method 1300 may be performed from the perspective of any of the software applications that is included in the suite of software applications and that is executing on the user computing device. For example, one or more of the steps of method 1300 may be repeated from the perspective of another software application included in the suite of software applications and executing on the user computing device.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 14:
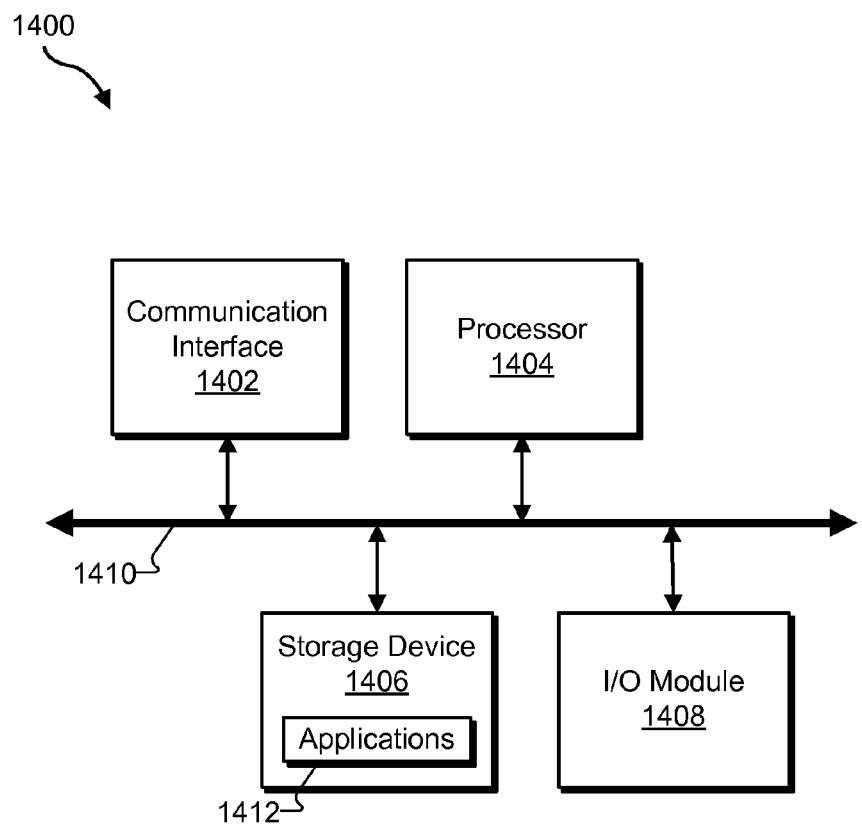
FIG. 14 illustrates an exemplary computing device according to principles described herein.

FIG. 14 illustrates an exemplary computing device 1400 that may be configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wired network interface (such as a network interface card), a wireless network interface (such as a wireless network interface card), a modem, an audio/video connection, and any other suitable interface.

Processor 1404 generally represents any type or form of processing unit capable of processing data or interpreting, executing, and/or directing execution of one or more of the instructions, processes, and/or operations described herein. Processor 1404 may execute and/or direct execution of operations as directed by one or more applications 1412 (which may include one or more software applications 102 included in suite 100) or other computer-executable instructions such as may be stored in storage device 1406 or another computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1406. For example, data representative of one or more executable applications 1412 configured to direct processor 1404 to perform any of the operations described herein may be stored within storage device 1406. In some examples, data may be arranged in one or more databases residing within storage device 1406.

I/O module 1408 may be configured to receive user input and provide user output and may include any hardware, firmware, software, or combination thereof supportive of input and output capabilities. For example, I/O module 1408 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1408 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

launching, by a user computing device, a software application included in a suite of software applications;

providing, by the user computing device for display on a display screen associated with the user computing device and in response to the launching of the software application, a graphical user interface screen of the software application included in the suite of software applications together with a user selectable option for selectively accessing for display by the user computing device, in response to a user selection of the user selectable option, an application shortcut graphical user interface associated with the suite of software applications;

receiving, by the user computing device, the user selection of the user selectable option;

determining, by the user computing device, whether a level of integration of each software application included in the suite of software applications relative to the user computing device is not installed, installed and up-to-date, or installed and outdated;

identifying, by the user computing device based on the level of integration of each software application included in the suite of software applications, an access option for each software application included in the suite of software applications; and providing, by the user computing device for display on the display screen and in response to the receiving of the user selection of the selectable option, the application shortcut graphical user interface that includes the access option for each software application included in the suite of software applications, each access option configured to be selected by a user of the user computing device to initiate access to the corresponding software application included in the suite of software applications.

2. The method of claim 1, wherein the application shortcut graphical user interface indicates the level of integration of each software application included in the suite of software applications relative to the user computing device.

3. The method of claim 1, wherein the user computing device performs the determining, the identifying, and the providing as directed by a software application included in the suite of software applications and executing on the user computing device.

4. The method of claim 1, wherein:

the determining of the level of integration of each software application included in the suite of software applications comprises determining a not-installed level of integration for a software application included in the suite of software applications and not installed on the user computing device;

the identifying of the access option for each software application included in the suite of software applications comprises identifying a download application access option for the software application having the not-installed level of integration; and the providing of the application shortcut graphical user interface comprises including the download application access option in the application shortcut graphical user interface for selection by the user to initiate a download, by the user computing device, of the software application having the not-installed level of integration.

5. The method of claim 4, wherein:

the determining of the level of integration of each software application included in the suite of software applications further comprises determining an installed and up-to-date level of integration for a software application included in the suite of software applications and installed on the user computing device;

the identifying of the access option for each software application included in the suite of software applications further comprises identifying a launch application access option for the software application having the installed and up-to-date level of integration; and the providing of the application shortcut graphical user interface further comprises including the launch application access option in the application shortcut graphical user interface for selection by the user to initiate a launch, by the user computing device, of the software application having the installed and up-to-date level of integration.

6. The method of claim 5, wherein:

the determining of the level of integration of each software application included in the suite of software applications further comprises determining an installed and outdated level of integration for a software application included in the suite of software applications and installed on the user computing device;

the identifying of the access option for each software application included in the suite of software applications further comprises identifying an update application access option for the software application having the installed and outdated level of integration; and the providing of the application shortcut graphical user interface further comprises including the update application access option in the application shortcut graphical user interface for selection by the user to initiate an update, by the user computing device, of the software application having the installed and outdated level of integration.

7. The method of claim 1, wherein the determining comprises:

polling, within the user computing device, the software applications included in the suite of applications for current state information;

not receiving a response to the polling from one of the software applications included in the suite of software applications; and assigning a not-installed level of integration to the non-responsive one of the software applications included in the suite of software applications.

8. The method of claim 7, wherein the determining further comprises:

receiving a response to the polling from another one of the software applications included in the suite of software applications and installed on the user computing device; and assigning an installed level of integration to the responsive another one of the software applications included in the suite of software applications.

9. The method of claim 1, wherein the determining comprises:

retrieving metadata for the suite of software applications from a server subsystem;

polling, within the user computing device, the software applications included in the suite of software applications for current state information; and using the retrieved metadata and any current state information received in response to the polling from one or more of the software applications that are installed on the user computing device to determine the levels of integration of the software applications included in the suite of software applications relative to the user computing device.

10. The method of claim 1, wherein the determining comprises:

retrieving metadata for the suite of software applications from a server subsystem, the metadata indicating newest available versions of the software applications included in the suite of software applications;

polling, within the user computing device, the software applications included in the suite of applications for current state information; and receiving a response to the polling from one of the software applications included in the suite of software applications and installed on the user computing device, the response indicating a current version of the one of the software applications included in the suite of software applications and installed on the user computing device; and comparing the current version of the one of the software applications to a newest available version of the one of the software applications indicated in the metadata; and assigning an update level of integration to the one of the software applications included in the suite of software applications when the current version and the newest available version of the one of the software applications included in the suite of software applications are different.

11. The method of claim 1, wherein, within the application shortcut graphical user interface, data representative of one or more of the software applications having an installed level of integration is listed before data representative of one or more other of the software applications having a not-installed level of integration.

12. The method of claim 1, further comprising:
determining, by the user computing device, current operational states of one or more of the software applications included in a suite of software applications; and
indicating, by the user computing device in the application shortcut graphical user interface, the current operational states of the one or more of the software applications included in the suites of software applications.

13. The method of claim 1, wherein the suite of software applications includes a digital video recorder ("DVR") manager application, a mobile communications subscription account management application, a home communications subscription account management application, a digital voice communications service application, a home control application, and a media manager application.

14. The method of claim 1, embodied as computer-executable instructions on at least one non-transitory computer-readable medium.

15. The method of claim 1, wherein the computing device comprises a mobile phone or a tablet computer.

16. The method of claim 1, wherein each software application included in the suite of software applications is configured to direct, when launching, the computing device to provide the user selectable option for selectively accessing the application shortcut graphical user interface associated with the suite of software applications.

17. A method comprising:
launching, by a user computing device, a software application installed on the user computing device, the software application included in a suite of software applications;
providing, by the user computing device for display on a display screen associated with the user computing device and in response to the launching of the software application, a graphical user interface screen of the software application together with a user selectable option for selectively accessing for display by the user computing device, in response to a user selection of the user selectable option, an application shortcut graphical user interface associated with the suite of software applications;
receiving, by the user computing device, the user selection of the user selectable option;
retrieving, by the user computing device as directed by the software application, metadata for the suite of software applications from a server subsystem, the metadata specifying the software applications included in the suite of software applications and newest version information for each of the software applications included in the suite of software applications;
polling, by the user computing device and within the user computing device as directed by the software application, each of the other software applications included in the suite of software applications for current state information;
using, by the user computing device as directed by the software application, the metadata and any current state information received in response to the polling to determine the current state of each of the other software applications included in the suite of software applications, the current state comprising an installed and up-to-date level of integration, an installed and outdated level of integration, or a not-installed level of integration;
identifying, by the user computing device as directed by the software application and based on the current state of each of the other software applications included in the suite of software applications, an access option for each of the other software applications included in the suite of software applications; and
providing, by the user computing device as directed by the software application and in response to the receiving of the user selection of the user selectable option, the application shortcut graphical user interface that indicates the current state of each of the other software applications included in the suite of software applications and that includes the access option for each of the other software applications included in the suite of software applications, each of the access options configured to be selected by a user of the user computing device to access, from within the software application, a corresponding one of the other software applications included in the suite of software applications.

18. The method of claim 17, wherein the access options comprise a launch application access option for launching a software application having an installed and up-to-date level of integration, an update application access option for updating a software application having an installed and outdated level of integration, and a download and install application access option for downloading and installing a software application having a not-installed level of integration.

19. The method of claim 17, wherein the current state of one or more of the other software applications included in the suite of software applications further comprises an operational state of the one or more of the other software applications included in the suite of software applications.

20. The method of claim 17, embodied as computer-executable instructions on at least one non-transitory computer-readable medium.

21. A system comprising:
a user computing device comprising at least one hardware processor; and
a software application executing on the user computing device and that directs the user computing device to provide, for display on a display screen associated with the user computing device and in response to a launching of a software application included in a suite of software applications, a graphical user interface screen of the software application included in the suite of software applications together with a user selectable option for selectively accessing for display by the user computing device, in response to a user selection of the user selectable option, an application shortcut graphical user interface associated with the suite of software applications, determine whether a level of integration of each software application included in the suite of software applications relative to the user computing device is not installed, installed and up-to-date, or installed and outdated, identify, based on the level of integration of each software application included in the suite of software applications, an access option for each of the software applications included in the suite of software applications, and provide, for display on the display screen and in response to the user selection of the user selectable option, the application shortcut graphical user interface that includes the access option for each software application included in the suite of software applications, the access options configured to be selected by a user of the user computing device to access, from within the software application executing on the user computing device, the software applications included in the suite of software applications.

22. The system of claim 21, wherein the access options comprise at least one of an access option to launch, an access option to update, and an access option to download and install one or more of the software applications included in the suite of software applications.

23. The system of claim 21, wherein the software application executing on the user computing device is included in the suite of software applications.

24. The system of claim 21, wherein the software application executing on the user computing device is not included in the suite of software applications.

* * * * *